UNITED STATES PATENT OFFICE.

OMER MARCHAND, OF ST. PAUL L'ERMITE, QUEBEC, CANADA, ASSIGNOR OF ONE-THIRD TO ALEXANDRINE GLACKMEYER, OF NEW YORK, N. Y., ONE-SIXTH TO ALEXANDRE ARCHAMBAULT, ONE-TWELFTH TO JULIENNE LAFONTAINE DESCHAMP, AND ONE-TWELFTH TO LEDA LAFONTAINE ARCHAMBAULT, OF ST. PAUL L'ERMITE, CANADA.

PAINT.

956,389.  Specification of Letters Patent.  Patented Apr. 26, 1910.

No Drawing.   Application filed July 20, 1908.  Serial No. 444,476.

To all whom it may concern:

Be it known that I, OMER MARCHAND, a subject of the King of England, and a resident of St. Paul l'Ermite, Province of Quebec, Dominion of Canada, have invented certain new and useful Improvements in Paints, of which the following is a full, clear, and exact description.

This invention relates more particularly to paints for metal surfaces.

The primary object of the invention is to provide a paint which will effectually prevent iron, steel, or similar metals from rusting, and which is particularly adapted for painting bridges, steel buildings and similar structures.

A further object of the invention is to provide a paint which will be cheaper than those ordinarily used, and which will last much longer, and will dry much quicker than the ordinary paint.

With these and other objects in view, the invention will be hereinafter more particularly described, and will then be pointed out in the claims at the end of the description.

While I shall particularly specify certain elements as composing the paint and certain methods whereby the paint may be made, it will be understood that I do not limit myself to the particular elements enumerated nor the exact proportions thereof, nor do I limit myself to the method described for making the paint.

To make a dark red paint I may take certain elements and combine them in the following proportions:—

| | | |
|---|---|---|
| Muriatic acid (30%) | 180 | ozs. |
| Nitric acid (70%) | 180 | ozs. |
| Sulfate of zinc | 2½ | lbs. |
| Caustic potash | 1¼ | lbs. |
| Carbonate of potash | 1¼ | lbs. |
| Rosin | 60 | lbs. |
| Zinc in sheets | 120 | ounces. |
| Oxid of iron (rust) | 112 | lbs. |
| Red ocher | 112 | lbs. |
| Linseed oil | 50 | imperial gals. |
| Substantially pure water | 50 | " " |
| Benzin | 4 | " " |

In the process of mixing, a portion of the sheets of zinc is dissolved in nitric acid and the remainder dissolved in muriatic acid; the caustic potash, sulfate of zinc, and carbonate of potash are then separately dissolved in a sufficient quantity of water for that purpose. The rosin is then dissolved in benzin, after which the oxid of iron is mixed in a sufficient quantity of oil to make a soft paste. When it is desired to make a red paint the red ocher is mixed in a sufficient quantity of oil and then added. It is obvious, however, that any other pigment may be substituted for the red ocher. The oxid of iron, so called, is insufficient to impart color by reason of the chemical changes it undergoes in the mixing. When the red ocher and oxid of iron is of a soft consistency, the other elements named are poured therein and the whole stirred to mix properly. When all the substances have been thus dissolved and mixed additional nitric acid in which some zinc has been dissolved is added to prevent coagulation. To the whole mixture is added a gallon of water and a gallon of oil, which is stirred until the oil and the water are perfectly mixed together. This operation is continued until the fifty (50) gallons of oil have been mixed with the fifty (50) gallons of water, less what has been used to dissolve the mixture previously referred to. When the ingredients have been mixed as already set forth the whole mixture is placed in a boiler and heated to the point of ebullition, after which the rosin is poured into the mixture, and the whole is boiled for about twenty (20) minutes when the entire contents should be filtered. If desired the zinc may be dissolved in one of the acids only, and the sulfate of zinc may in some instances be omitted and satisfactory results obtained.

Having thus described my invention, I claim as new and desire to secure by Letters Patent:—

1. A paint composed of a mixture of sulfate of zinc, caustic potash, carbonate of potash, nitric acid, rosin dissolved in benzin, zinc dissolved in muriatic acid, oxid of iron, a pigment in addition to the oxid of iron, linseed oil, and a sufficient quantity of water.

2. A paint composed of a mixture of sulfate of zinc, caustic potash, carbonate of potash, nitric acid, rosin dissolved in benzin, zinc dissolved in muriatic acid, oxid of iron, red ocher, linseed oil, and a sufficient quantity of water.

3. A paint composed of a mixture of caustic potash, carbonate of potash, rosin dissolved in benzin, nitric acid, zinc in sheets dissolved in muriatic acid, oxid of iron, a pigment in addition to the oxid of iron, linseed oil, and water.

4. A paint composed of a mixture of zinc dissolved in muriatic acid, sulfate of zinc, caustic potash, carbonate of potash, linseed oil, a pigment in addition to the oxid of iron, rosin dissolved in benzin, and an element to prevent coagulation.

5. A paint composed of a mixture of zinc dissolved in an acid, caustic potash, carbonate of potash, linseed oil, oxid of iron, a pigment in addition to the oxid of iron, rosin dissolved in benzin, and an element to prevent coagulation.

6. A paint composed of a mixture of zinc dissolved in muriatic acid, caustic potash, carbonate of potash, an acid, rosin dissolved in benzin, oxid of iron, a pigment in addition to the oxid of iron, and linseed oil.

This specification signed and witnessed this 14th day of July A. D. 1908.

OMER MARCHAND.

Witnesses:
P. A. SEGUIN,
J. C. JETTI.